United States Patent
Yamada et al.

(10) Patent No.: US 10,260,704 B2
(45) Date of Patent: Apr. 16, 2019

(54) VEHICLE LAMP

(71) Applicant: HONDA MOTOR CO., LTD., Tokyo (JP)

(72) Inventors: Akira Yamada, Wako (JP); Shunsuke Iwao, Wako (JP); Koji Ueda, Wako (JP); Ryo Chijimatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 14/893,555

(22) PCT Filed: May 19, 2014

(86) PCT No.: PCT/JP2014/063186
§ 371 (c)(1),
(2) Date: Nov. 24, 2015

(87) PCT Pub. No.: WO2014/192572
PCT Pub. Date: Dec. 4, 2014

(65) Prior Publication Data
US 2016/0102834 A1   Apr. 14, 2016

(30) Foreign Application Priority Data
May 28, 2013 (JP) .................... 2013-111903

(51) Int. Cl.
*B60Q 1/00* (2006.01)
*B60Q 1/26* (2006.01)
(Continued)

(52) U.S. Cl.
CPC .......... *F21S 43/247* (2018.01); *B60Q 1/0047* (2013.01); *B60Q 1/0052* (2013.01);
(Continued)

(58) Field of Classification Search
CPC ..... G02B 6/001; G02B 6/0006; G02B 6/0061
See application file for complete search history.

(56) References Cited

U.S. PATENT DOCUMENTS

| | | | | |
|---|---|---|---|---|
| 5,432,876 A | * | 7/1995 | Appeldorn | G02B 6/001 362/554 |
| 6,570,710 B1 | * | 5/2003 | Nilsen | G02B 1/11 359/251 |

(Continued)

FOREIGN PATENT DOCUMENTS

| | | |
|---|---|---|
| JP | 10-339815 | 12/1998 |
| JP | 2001-005122 | 1/2001 |

(Continued)

OTHER PUBLICATIONS

English translation of (JP 2003-151334).*
(Continued)

*Primary Examiner* — Alexander K Garlen
*Assistant Examiner* — Eric T Eide
(74) *Attorney, Agent, or Firm* — Rankin, Hill & Clark LLP

(57) ABSTRACT

A vehicle lamp includes a light source mounted on a vehicle body and a light guide body for guiding light generated by the light source. On the light guide body, vertically to a light travelling direction, a plurality of notch-shaped portions are formed in line. The notch-shaped portions become narrow in pitch as the distance from the light source increases and are formed deeper as the distance from the light source increases. Preferably, the notch-shaped portions exhibit arc cross-sections having the same curvature radius, and the depths of the notch-shaped portions are specified by the central angles of the arc cross-sections.

11 Claims, 10 Drawing Sheets

(51) Int. Cl.
*F21V 8/00* (2006.01)
*F21S 43/14* (2018.01)
*F21S 43/237* (2018.01)
*F21S 43/241* (2018.01)
*F21S 43/245* (2018.01)
*F21S 43/247* (2018.01)
*F21S 2/00* (2016.01)

(52) U.S. Cl.
CPC ............... *B60Q 1/26* (2013.01); *F21S 43/14* (2018.01); *F21S 43/237* (2018.01); *F21S 43/241* (2018.01); *F21S 43/245* (2018.01); *G02B 6/001* (2013.01); *G02B 6/0038* (2013.01); *G02B 6/0045* (2013.01); *G02B 6/0061* (2013.01); *G02B 6/0073* (2013.01); *G02B 6/0095* (2013.01)

(56) References Cited

U.S. PATENT DOCUMENTS

| | | | | |
|---|---|---|---|---|
| 7,076,148 B2* | 7/2006 | Nemoto | ............... | G02B 6/0038 362/610 |
| 7,180,690 B2* | 2/2007 | Nagao | ............... | G02B 6/0053 359/625 |
| 7,857,471 B2* | 12/2010 | Ohta | ............... | G02F 1/13362 362/19 |
| 8,979,349 B2* | 3/2015 | Bita | ............... | G02B 6/0036 362/615 |
| 2005/0189545 A1* | 9/2005 | Tazawa | ............... | B60Q 1/0011 257/79 |
| 2006/0067084 A1* | 3/2006 | Stefanov | ............... | F21S 48/2237 362/511 |
| 2010/0202153 A1* | 8/2010 | Schwab | ............... | B60Q 1/0041 362/520 |
| 2010/0254152 A1* | 10/2010 | Taleb-Bendiab | ..... | B60Q 1/0035 362/551 |
| 2014/0300528 A1* | 10/2014 | Ebisui | ............... | G02B 27/2214 345/32 |
| 2015/0362659 A1* | 12/2015 | Nishihata | ............... | G02B 6/0038 362/511 |

FOREIGN PATENT DOCUMENTS

| | | |
|---|---|---|
| JP | 2001-296524 | 10/2001 |
| JP | 2003-151334 | 5/2003 |
| JP | 2003-297109 | 10/2003 |
| JP | 2005-267928 | 9/2005 |

OTHER PUBLICATIONS

International Search Report dated Aug. 12, 2014, Application No. PCT/JP2014/063186, English translation included.
Japanese Office Action dated May 30, 2016.

\* cited by examiner

FIG.6
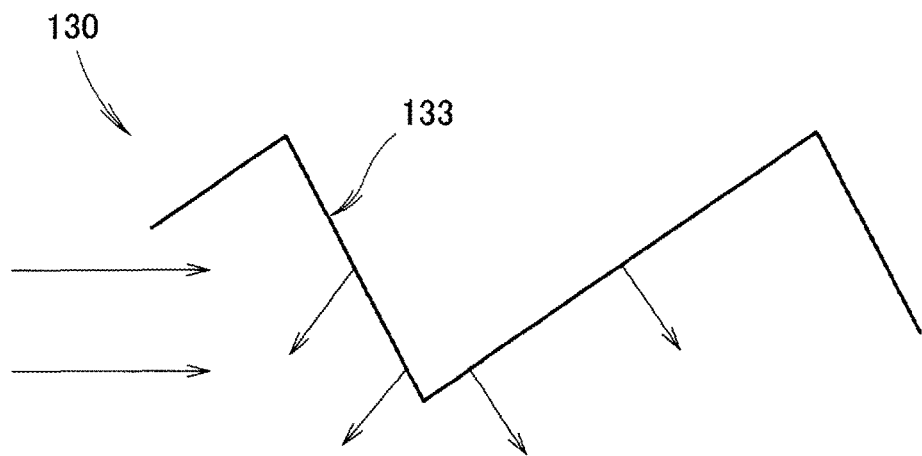
(a) COMPARATIVE EXAMPLE
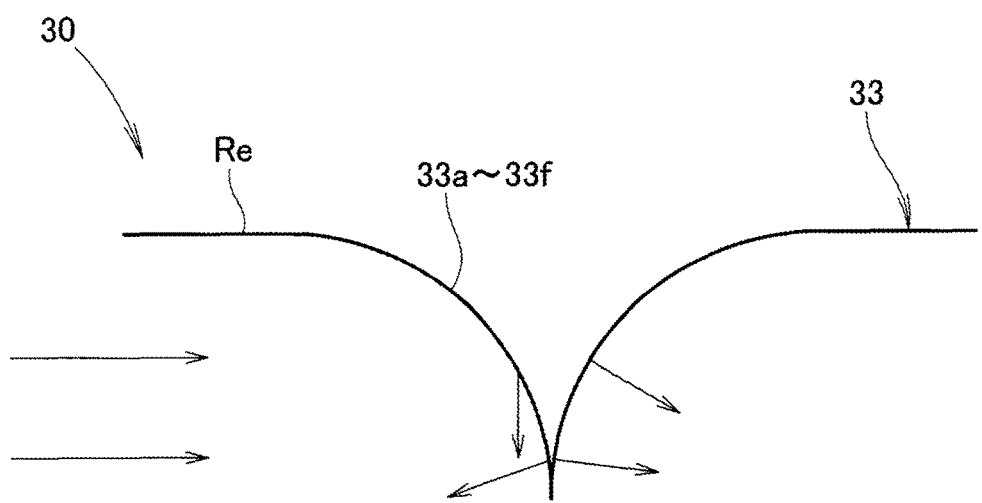
(b) EMBODIMENT

FIG.11
(a)
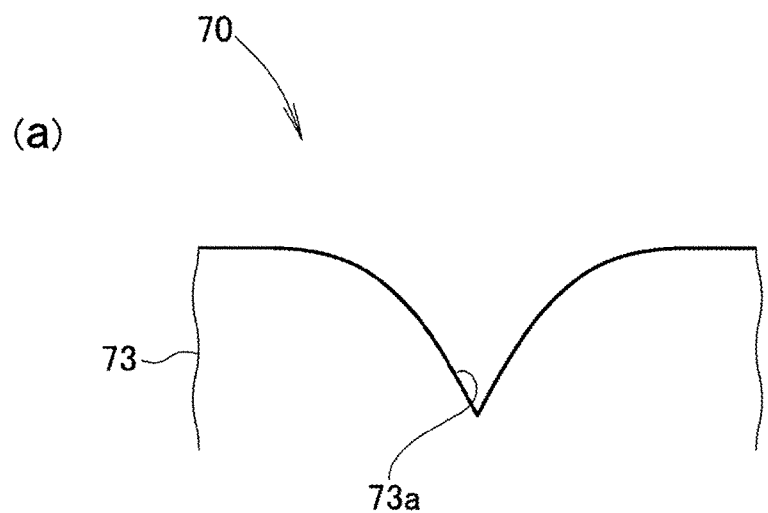
(b)
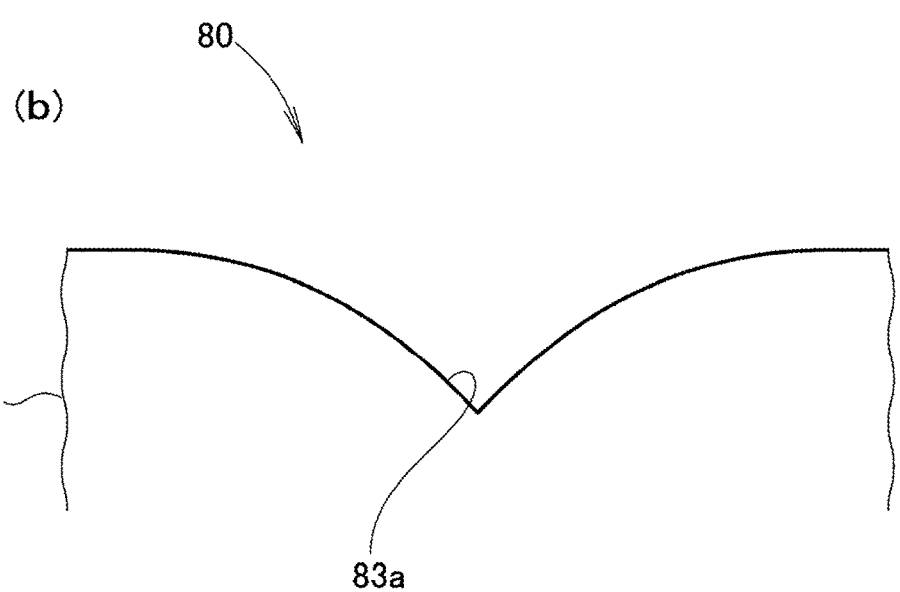

VEHICLE LAMP

TECHNICAL FIELD

The present invention relates to an improved vehicle lamp.

BACKGROUND ART

Among the conventionally-known techniques related to lamps mounted on vehicles (i.e., vehicle lamps) is one disclosed in Patent Literature 1.

The vehicle lamp disclosed in Patent Literature 1 is for use as a blinker lamp of an automotive vehicle and includes a light source, and a light guide member for guiding light emitted by the light source. The light guide member has a plurality of recess-shaped portions formed therein perpendicularly to a traveling direction of light. Pitches between the recess-shaped portions progressively narrow or decrease as distances, from the light source, of the recess-shaped portions increase, i.e., with the increasing distance from the light source.

Light within the light guide member reflects toward outside at positions where the recess-shaped portions are formed. Energy of the light is great in the neighborhood of the light source, and thus, sufficient light can be secured with a small number of the recess-shaped portions formed in that neighborhood. The light energy decreases with the increasing distance from the light source. Therefore, in such a distant area, a greater number of recess-shaped portions are formed so that more light can be reflected and thus necessary light can be secured. With the vehicle lamp constructed as above, the entire light guide member can be illuminated uniformly.

Such a vehicle lamp has a function of allowing a person (or persons) outside the vehicle to recognize the vehicle. In order to allow a person outside the vehicle to recognize the vehicle, it is desirable that the light guide member can be illuminated uniformly and in various illumination styles.

PRIOR ART LITERATURE

Patent Literature

Patent Literature 1: Japanese Patent Application Laid-Open Publication No. 2005-2667928

SUMMARY OF INVENTION

Technical Problem

It is therefore an object to provide a technique which can freely control a degree of brightness (brightness and darkness) of light emitted from a vehicle lamp.

Solution to Problem

According to one aspect of the present invention, there is provided an improved vehicle lamp including a light source mounted on a vehicle body, and a light guide member for guiding light emitted by the light source, characterized in that the light guide member has a row of a plurality of recess-shaped portions formed therein substantially perpendicularly to a traveling direction of the light emitted by the light source, and the recess-shaped portions are formed in such a manner that, as distances, from the light source, of individual ones of the recess-shaped portions increase, pitches between the recess-shaped portions decrease and depths of the recess-shaped portions increase.

Preferably, the plurality of recess-shaped portions each have an arcuate section of a same radius of curvature, and the depth of each of the recess-shaped portions is defined by a central angle of the arcuate section.

Preferably, each of the recess-shaped portions comprises a pair of opposed surfaces formed in a line-symmetric relation to each other such that the opposed surfaces extend from one point gradually away from each other, and, as viewed perpendicularly to a surface where the recess-shaped portions are formed, respective edges of the pair of opposed surfaces form a line corresponding to a part of a halved parabola.

Preferably, each of the recess-shaped portions comprises a pair of opposed surfaces formed in a line-symmetric relation to each other such that the opposed surfaces extend from one point gradually away from each other, and, as viewed perpendicularly to a surface where the recess-shaped portions are formed, respective edges of the pair of opposed surfaces form a line corresponding to at least a part of a line of an ellipse divided into one-fourth along long and short axes thereof.

Preferably, as viewed in a section taken along an arranged direction of the plurality of recess-shaped portions, portions between the recess-shaped portions are each formed straight or substantially straight such that the light does not leak to outside of the light guide member.

Preferably, the depths of the recess-shaped portions are set within a range of 0.01 μm to 25.00 μm, and the pitches between the recess-shaped portions are set equal to or greater than a lower limit value of 0.1 mm.

Advantageous Effects of Invention

According to the present invention, the recess-shaped portions are formed in such a manner that, as the distances, from the light source, of the individual recess-shaped portions increase, the pitches between the recess-shaped portions decrease and the depths of the recess-shaped portions increase. The light in the interior of the light guide member reflects toward outside at positions where the recess-shaped portions are formed. Because the light energy is great in the neighborhood of the light source, sufficient brightness can be secured by only a small number of the recess-shaped portions formed with small or shallow depths in that neighborhood. On the other hand, the light energy decreases with the increasing distance from the light source. In such a portion distant from the light source, a greater number of the recess-shaped portions are formed with greater or deeper depths. With the aforementioned arrangements, it is possible to secure necessary brightness. By adjusting the pitches and depths of the recess-shaped portions, it is possible to lightly illuminate a portion of the light guide member most distant from the light source and lightly illuminate a longitudinal middle portion of the light guide member. Thus, the present invention can freely control a degree of brightness (brightness and darkness) of light and enhance outer appearance quality.

Further, according to the present invention, the plurality of recess-shaped portions each have an arcuate section. If each of the recess-shaped portions is shaped to have a straight section, the light tends to reflect in similar directions. As a consequence, the vehicle lamp looks bright or dark depending on the angle it is viewed at from the outside. By contrast, in the present invention, each of the recess-shaped portions has an arcuate section, so that the light reflects in various directions. In this way, the vehicle lamp can be illuminated with substantially uniform brightness irrespective of the angle it is viewed at from the outside. Thus, the vehicle lamp can have a high visibility from the outside.

Further, according to the present invention, the respective edges of the pair of opposed surfaces of the recess-shaped portion form a line corresponding to a part of a halved parabola. If the recess-shaped portion is shaped to have a straight section, the light tends to reflect in similar directions. As a consequence, the vehicle lamp looks bright or dark depending on the angle it is viewed at from the outside. By contrast, in the present invention, each of the recess-shaped portions has an arcuate section, so that the light reflects in various directions. In this way, the vehicle lamp can be illuminated with substantially uniform brightness irrespective of the angle it is viewed at from the outside. Thus, the vehicle lamp can have a high visibility from the outside.

Further, according to the present invention, the respective edges of the pair of opposed surfaces of the recess-shaped portion form a line corresponding to a part of a halved parabola. If the recess-shaped portion is shaped to have a straight section, the light tends to reflect in similar directions. As a consequence, the vehicle lamp looks bright or dark depending on the angle it is viewed at from the outside. By contrast, in the present invention, each of the recess-shaped portions has an arcuate section, so that the light reflects in various directions. In this way, the vehicle lamp can be illuminated with substantially uniform brightness irrespective of the angle it is viewed at from the outside. Thus, the vehicle lamp can have a high visibility from the outside.

Further, according to the present invention, the respective edges of the pair of opposed surfaces of the recess-shaped portion form a line corresponding to at least a part of a line of an ellipse divided into one-fourth along long and short axes thereof. If the recess-shaped portion is shaped to have a straight section, the light tends to reflect in similar directions. As a consequence, the vehicle lamp looks bright or dark depending on the angle it is viewed at from the outside. By contrast, in the present invention, each of the recess-shaped portions has an arcuate section, so that the light reflects in various directions. In this way, the vehicle lamp can be illuminated with substantially uniform brightness irrespective of the angle it is viewed at from the outside. Thus, the vehicle lamp can have a high visibility from the outside.

Furthermore, according to the present invention, as viewed in a section taken along the arranged direction of the plurality of recess-shaped portions, the portions between the recess-shaped portions are each formed straight or substantially straight such that the light does not leak to outside of the light guide member. In the surface portions formed straight or substantially straight, the light does not reflect toward outside of the light guide member. In this way, it is possible to reduce light energy loss occurring between the recess-shaped portions and thereby finely control the degree of brightness (brightness and darkness) of the light.

Furthermore, according to the present invention, the depths of the recess-shaped portions are set within the range of 0.01 µm to 25.00 µm, and the pitches between the recess-shaped portions are set equal to or greater than the lower limit value of 0.1 mm. It has been found that the outer appearance quality of the light guide member when the light source is OFF or in a non-illuminated state has a tendency of degrading as the recess-shaped portion depth increases above 25.00 µm. It is considered that such degrading of the outer appearance quality is due to the fact that the recess-shaped portion appears as a line because it is deep. Therefore, it is preferable that the depth of the recess-shaped portion be 0.01 µm or more but 25.00 µm or less.

It has also been found that, if the pitch between the recess-shaped portions is 0.01 mm or less, the outer appearance quality of the light guide member when the light source is in the non-illuminated state has a tendency of degrading. It is considered that such degrading of the outer appearance quality is due to the fact that, even where the recess-shaped portions are shallow or small in depth, the light guide member becomes undesirably cloudy because the recess-shaped portions are located too close to each other. Therefore, it is preferable the pitch between the recess-shaped portions be 0.10 mm or more.

Because the depths of the recess-shaped portions are set within a range of 0.01 µm to 25.00 µm and the pitches between the recess-shaped portions are set equal to or greater than the lower limit value of 0.1 mm, the present invention can improve the outer appearance quality of the light guide member when the light source is in the non-illuminated state. Namely, the present invention can provide a vehicle lamp presenting a high outer appearance quality both when the light source is in the illuminated state and when the light source is in the non-illuminated state.

BRIEF DESCRIPTION OF DRAWINGS

FIG. 6 is a view explanatory of operation of the recess-shaped portions shown in FIG. 3;

FIG. 11 is an enlarged view showing recess-shaped portions employed in a third embodiment of the vehicle lamp of the present invention.

DESCRIPTION OF EMBODIMENTS

Now, embodiments of the present invention will be described, with reference to the accompanying drawings, in relation to a case where a vehicle lamp of the invention is applied as a position lamp for a vehicle.

Embodiment 1

Figure 1:
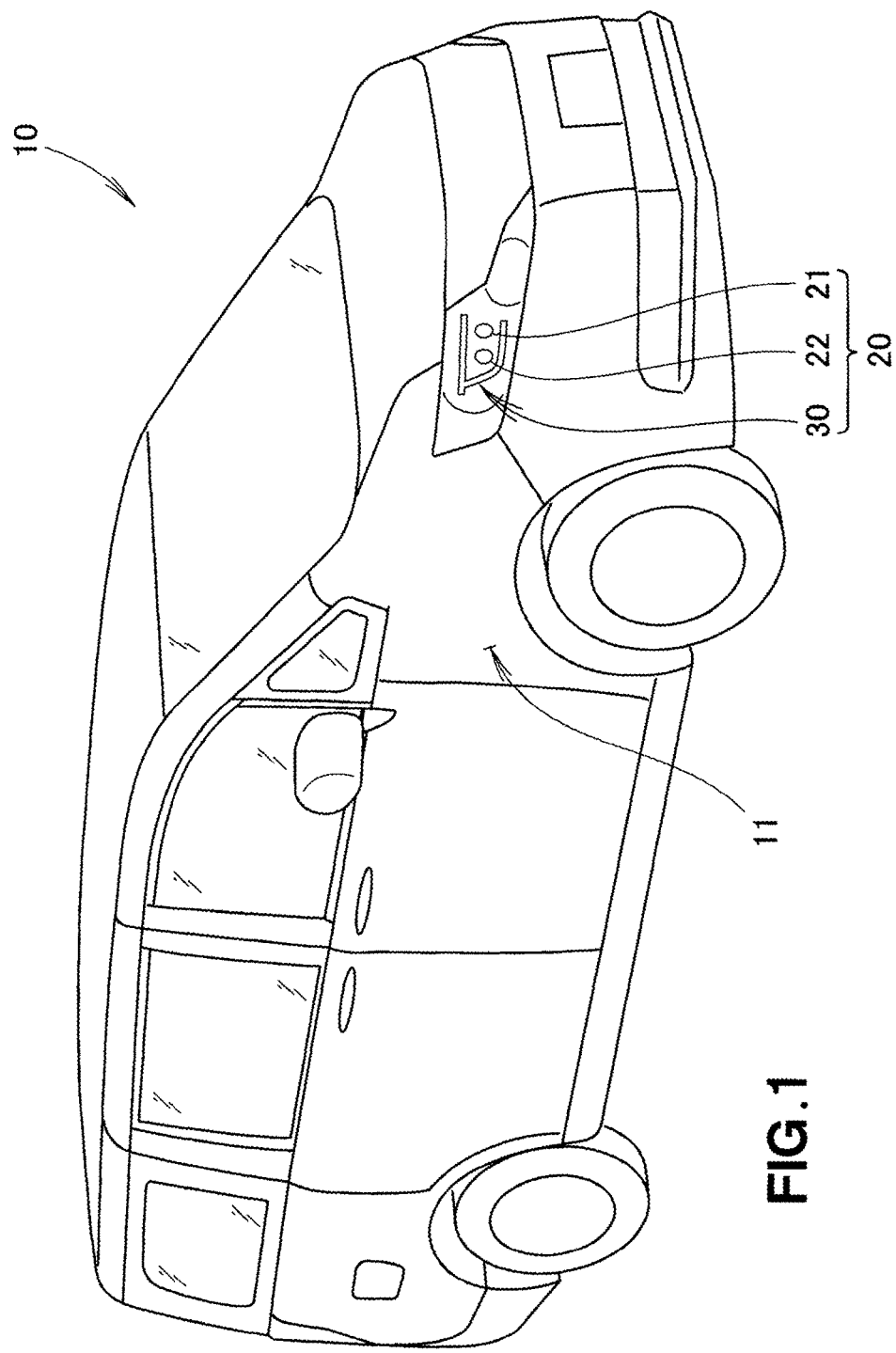
FIG. 1 is a perspective view of a vehicle on which is mounted a first embodiment of a vehicle lamp of the present invention.

As shown in FIG. 1, a headlight unit 20 is mounted on a front section of a vehicle body 11 constituting a frame of the vehicle 10. The headlight unit 20 includes: a high beam bulb 21 for illuminating an area in front of the vehicle 10; a lower beam bulb 22 for illuminating an area forward and downward of the vehicle 10; and a position lamp 30 (vehicle lamp 30) provided to surround the high beam bulb 21 and the lower beam bulb 22.

Figure 2:
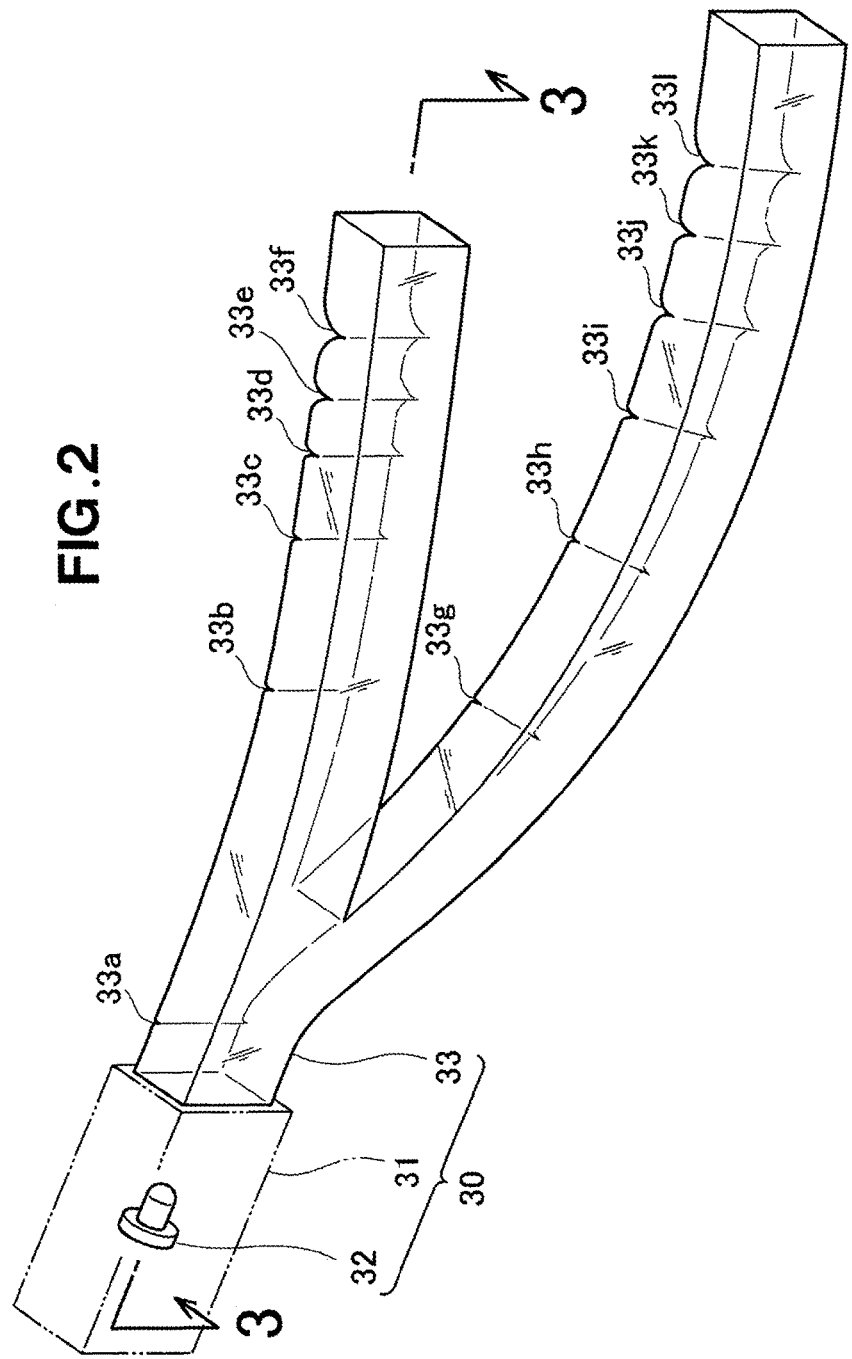
FIG. 2 is a perspective view of the position lamp shown in FIG. 1.

The position lamp 30 is provided to allow a person(s) outside the vehicle to readily recognize the vehicle 10. With reference to FIG. 2 and subsequent figures, a detailed description will be given about the position lamp 30.

As shown in FIG. 2, the position lamp 30 includes: a housing 31; a light source 32 in the form of an LED accommodated in the housing 31; and a light guide member 33 of a generally Y shape provided adjacent to the light source 32.

The light guide member 33, which is formed for example of acryl, slightly curves as a whole along the contour of a part of the vehicle body 11. The light guide member 33 has a plurality of recess-shaped portions 33a to 33l formed therein perpendicularly to a traveling direction of light emitted by the light source 32. The recess-shaped portions 33a to 33l differ from one another in depth.

In the present invention, positions where the recess-shaped portions 33a to 33l (formed positions of the recess-shaped portions 33a to 33l) and respective depths of the recess-shaped portions 33a to 33l are particularly important. The recess-shaped portions 33a to 33f and the recess-shaped portions 33g to 33l are based on the same technical idea of the invention, and thus, the following describe in detail the recess-shaped portions 33a to 33f with a detailed description about the recess-shaped portions 33g to 33l omitted to avoid unnecessary duplication.

Each of the recess-shaped portions 33a to 33l only need be of a traversal notch-shaped groove. Namely, the recess-shaped portions 33a to 33l need not necessarily be formed by recessing. The light guide member 33 and the recess-shaped portions 33a to 33f will be detailed hereinbelow with reference to FIG. 3 and subsequent figures.

Figure 3:
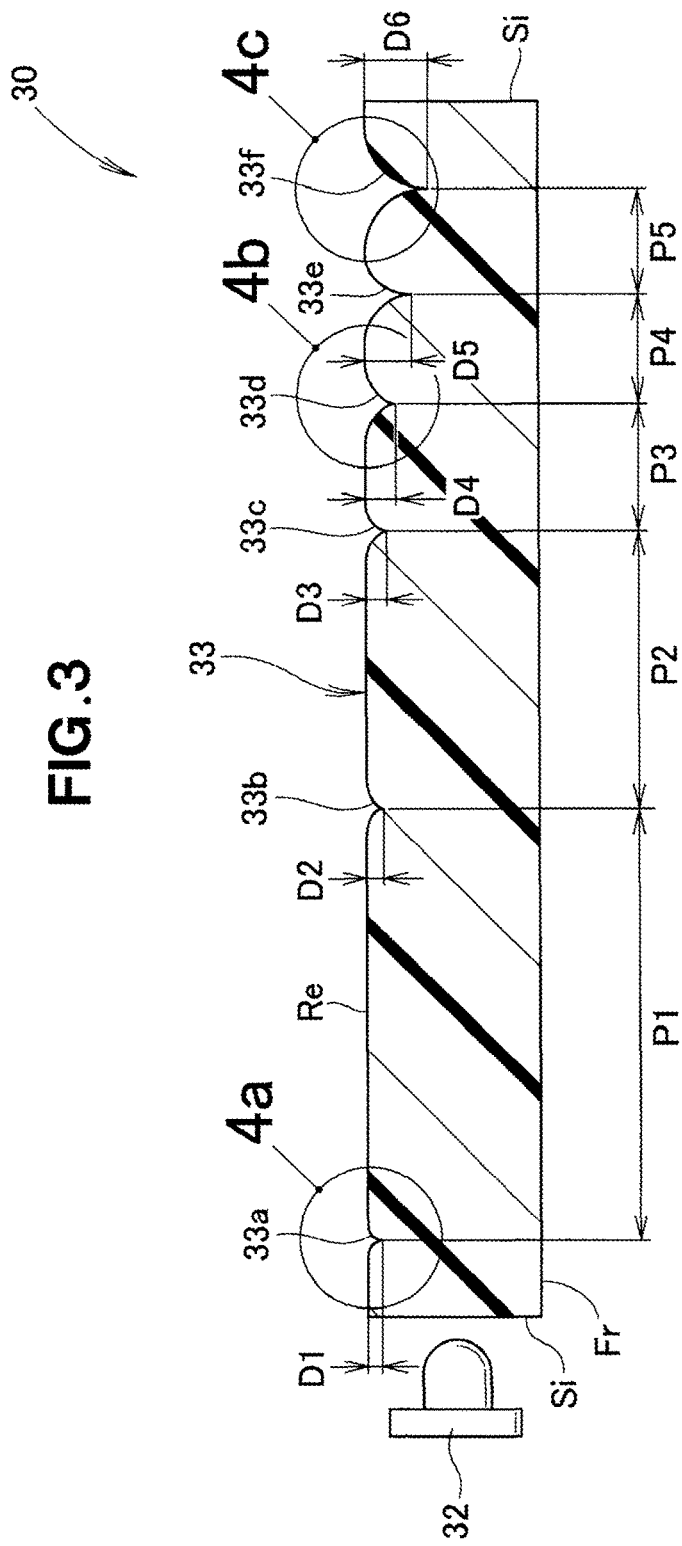
FIG. 3 is a sectional view taken along the 3-3 line of FIG. 2.

As shown in FIG. 3, the recess-shaped portions 33a to 33f are formed in a back surface section Re of the light guide member 33. A front surface section Fr and side surface sections Si of the light guide member 33 are formed as flat surfaces. Upper and lower surface sections of the light guide member 33 are also formed as flat surfaces.

Lengths between the individual recess-shaped portions 33a to 33f will be referred to as pitches. The pitches P1 to P5 narrow or decrease as distances, from the light source 32, of the recess-shaped portions 33a to 33f increase; that is, the pitches P1 to P5 decrease with the increasing distance from the light source 32. Further, respective depths D1 to D6 of the recess-shaped portions 33a to 33f increase as the distances, from the light source 32, of the recess-shaped portions 33a to 33f increase; that is, the recess-shaped portions 33a to 33f are formed deeper with the increasing distance from the light source 32. The pitches P1 to P5 between the recess-shaped portions 33a to 33f are measured by measuring distances between the respective deepest parts of the recess-shaped portions 33a to 33f.

A back surface portion between the recess-shaped portion 33a and the recess-shaped portion 33b is formed straight (i.e., as a straight surface) in the illustrated example of FIG. 3. Actually, however, because the light guide member 33 extends along the contour of a part of the vehicle body 11 (FIG. 1), the back surface portion between the recess-shaped portion 33a and the recess-shaped portion 33b slightly curves. Curvature of the back surface portion between the recess-shaped portion 33a and the recess-shaped portion 33b is set such that the light traveling within the light guide member 33 does not leak to outside of the light guide member 33. Back surface portions between the other recess-shaped portions are formed in a similar manner to the back surface portion between the recess-shaped portion 33a and the recess-shaped portion 33b. Namely, the back surface portions between the recess-shaped portions 33a to 33e and the recess-shaped portions 33b to 33f are formed substantially straight such that the light traveling within the light guide member 33 does not leak to outside of the light guide member 33.

FIG. 4(a) shows in enlarged scale a section encircled at 4a in FIG. 3. Similarly, FIG. 4(b) shows in enlarged scale a section encircled at 4b in FIG. 3, and FIG. 4(c) shows in enlarged scale a section encircled at 4c in FIG. 3.

As shown in FIG. 4(a), the recess-shaped portion 33a is shaped such that arcuate back surfaces, each having a radius γ and a central angle θ1, are opposed to each other. Namely, the recess-shaped portion 33a comprises two arcuate back surfaces opposed to each other and these opposed arcuate back surfaces have the same radius and same central angle. The other recess-shaped portions 33b to 33l are shaped substantially similarly to the recess-shaped portion 33a.

As shown in FIG. 4(b), the recess-shaped portion 33d is shaped such that arcuate back surfaces, each having a radius γ and a central angle θ4, are opposed to each other. Further, as shown in FIG. 4(c), the recess-shaped portion 33f is shaped such that arcuate back surfaces, each having a radius γ and a central angle θ6, are opposed to each other. The central angle θ6 is 90° that is the greatest angle the central angle θ can take.

As seen in FIGS. 4(a) to 4(c), the depths D1, D4 and D6 of the recess-shaped portions 33a, 33d and 33f are in relationship of D1<D4<D6, and the center angles θ1, θ4 and θ6 of the recess-shaped portions 33a, 33d and 33f are in relationship of 0°<θ≤90° and θ1<θ4<θ6.

Referring also to FIG. 3, the plurality of recess-shaped portions 33a to 33f each have an arcuate section of the same radius of curvature γ, and the depths D1 to D6 of the recess-shaped portions 33a to 33f are defined or determined by the center angles θ of the arcuate sections of the recess-shaped portions 33a to 33f.

Figure 5:
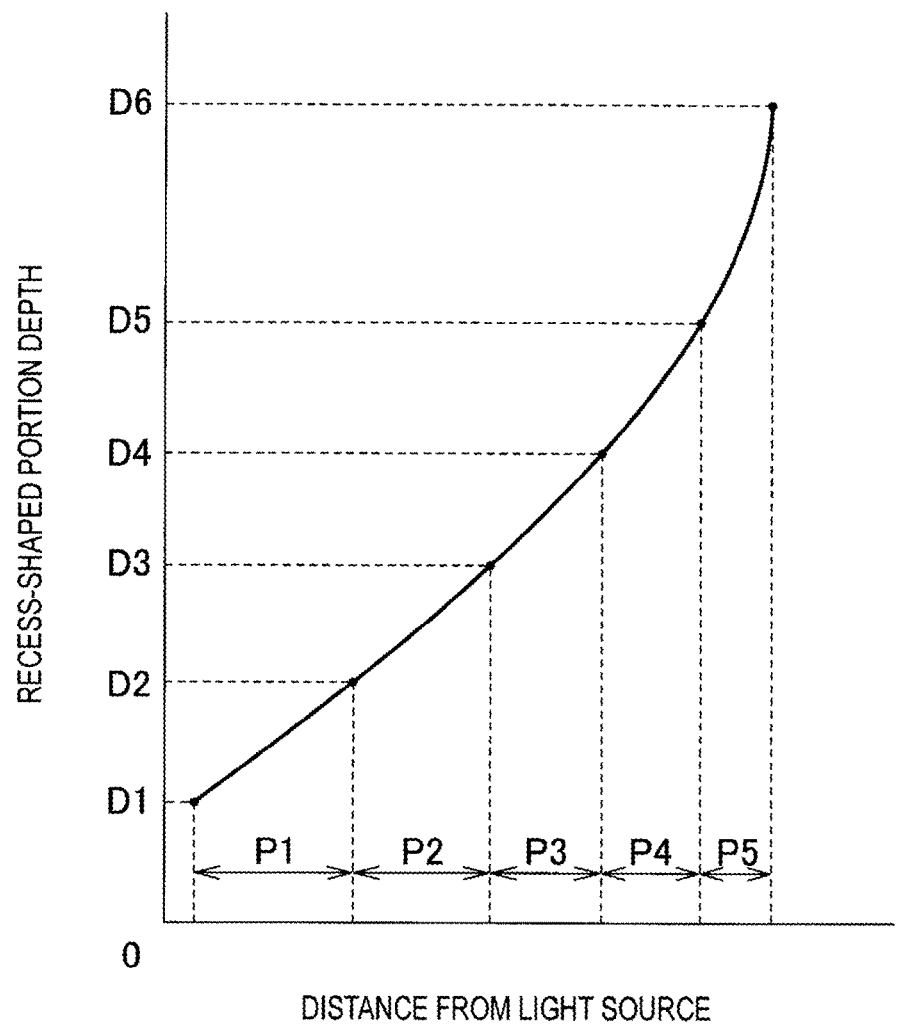
FIG. 5 is a graph showing relationship between formed positions of the individual recess-shaped portions and depths of the recess-shaped portions.

FIG. 5 shows relationship between the distances, from the light source, of the individual recess-shaped portions 33a to 33f and the depths of the recess-shaped portions 33a to 33f. Namely, in FIG. 5, the distances, from the light source, of the individual recess-shaped portions 33a to 33f are plotted on the horizontal axis, and the depths of the recess-shaped portions 33a to 33f are plotted on the vertical axis.

Referring also to FIG. 3, in the case where the distances, from the light source, of the individual recess-shaped portions 33a to 33f and the depths of the recess-shaped portions 33a to 33f are in the relationship shown in FIG. 5, the position lamp 30 shown in FIG. 3 is illuminated with the greatest brightness at a portion distant from the light source 32, i.e. in the neighborhood of the recess-shaped portion 33f.

The way to illuminate the position lamp 30 can be changed by changing inclinations of a graph curve shown in FIG. 5, under condition that the pitches P1 to P5 are set to narrow or decrease and the depths D1 to D6 are set to increase as the distances, from the light source, of the individual recess-shaped portions 33a to 33f increase; namely, P1>P2>P3>P4>P5, and D1<D2<D3<D4<D5<D6.

Namely, the light in the interior of the light guide member 33 reflects toward the outside (depicted at Fr in FIG. 3) of the light guide member 33 at positions where the recess-shaped portions 33a to 33f are formed. Because the light energy is great in the neighborhood of the light source 32, sufficient brightness can be secured in the neighborhood of the light source 32 with a small number of the recess-shaped portions (e.g., the recess-shaped portion 33a) formed into a small or shallow depth in the neighborhood.

On the other hand, the light energy decreases with the increasing distance from the light source 32. In such a portion distant from the light source 32, a greater number of the recess-shaped portions (e.g., the recess-shaped portions 33e and 33f) are formed with greater or deeper depths.

With the aforementioned arrangements, it is possible to secure necessary brightness. By adjusting the pitches P1 to P5 and depths D1 to D6 of the recess-shaped portions 33a to 33f, it is possible to lightly illuminate a portion of the light guide member 33 most distant from the light source 32. Further, it is possible to lightly illuminate a longitudinal middle portion of the light guide member 33. In this way, it is possible to freely control a degree of brightness (brightness and darkness) of the light and enhance an outer appearance of the vehicle lamp.

In a comparative example shown in FIG. 6(a), a recess-shaped portion 133 is shaped to have straight surfaces. Because of the straight surfaces, light tends to reflect from the recess-shaped portion 133 in fixed, similar directions as indicated by arrows; the light can easily reflect in some directions but is difficult to reflect in the other directions. As a consequence, the position lamp 130 looks bright or dark depending on the angle it is viewed at from the outside.

As shown in FIG. 6(b), each of the recess-shaped portions 33a to 33f in the instant embodiment of the invention, on the other hand, has arcuate sections, so that the light reflects in various directions as indicated by arrows. In this way, the position lamp 30 can be illuminated with substantially uniform brightness irrespective of the angle it is viewed at from the outside. Thus, the position lamp 30 can have a high visibility from the outside.

Referring also to FIG. 3, the surface portions between the recess-shaped portions 33a to 33e and the surface portions between the recess-shaped portions 33b to 33f are formed straight as viewed in section or formed substantially straight as viewed in section such that the light does not leak to outside of the light guide member 33. In the surface portions formed straight or substantially straight, the light does not reflect toward outside of the light guide member 33. In this way, it is possible to reduce light energy loss occurring between the recess-shaped portions 33a to 33f and thereby finely control the degree of brightness (brightness and darkness) of the light.

The inventors of the present invention etc. found that the degree of brightness (brightness and darkness) of the light can be freely controlled and the outer appearance of the vehicle lamp 30 by adjusting the depths and pitches of the recess-shaped portions. The light guide member is a component part that is visible from outside of the vehicle when the light source is OFF (i.e., in a non-illuminated state), such as during daytime. It was also found that, if the depths of the recess-shaped portions are too deep and the pitches between the recess-shaped portions are too short, the recess-shaped portions would undesirably appear as lines and the light guide member would undesirably appear cloudy. If the light guide member appears cloudy like this, the outer appearance of the light guide member and hence the vehicle lamp would be impaired. For these reasons, the inventors of the present invention etc. conducted the following experiments with a view to providing an improved vehicle lamp that can have an improved outer appearance quality even when the light source is OFF or in the non-illuminated state.

Figure 7:
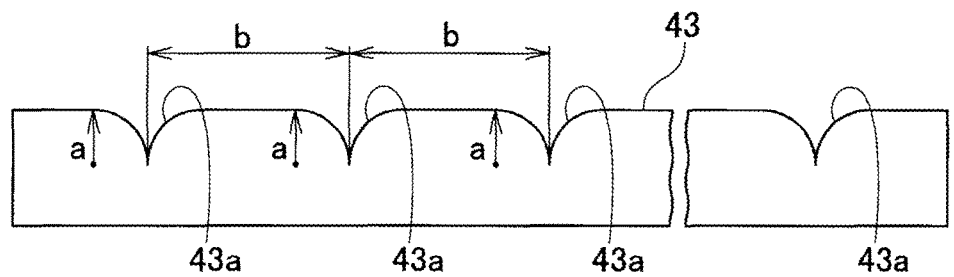
FIG. 7 is a view showing a test piece of a light guide member that was used in experiments conducted for depths and pitches of the recess-shaped portions shown in FIG. 3.

FIG. 7 shows a test piece 43 of the light guide member that was used in the experiments. The test piece 43 has recess-shaped portions 43a, each having a depth (recess-shaped portion depth) of a (μm), formed therein with a pitch of b (mm). Namely, in the one test piece 43, the recess-shaped portions 43a have the same depth (recess-shaped portion depth) a (μm) and the same pitch b (mm).

The experiments were carried out using a plurality of test pieces 43 made with the depth a (μm) and pitch b (mm) differentiated among the test pieces 43. More specifically, the experiments were carried out by measuring Haze values of the individual test pieces 43. If the Haze value is less 50, the light guide member is judged or determined acceptable because it is not cloudy or, if cloudy, it does not substantively influence the outer appearance of the light guide member. If the haze value is 50 or more, on the other hand, the light guide member is determined unacceptable because it substantively influences the outer appearance of the light guide member. Results of the experiments are shown below.

TABLE 1

| | | b pitch (mm) | | | | | |
|---|---|---|---|---|---|---|---|
| | | 0.01 | 0.05 | 0.10 | 0.20 | 0.30 | 0.50 |
| a | 0.01 | ◯ | ◯ | ◯ | ◯ | ◯ | ◯ |
| recess-shaped | 1.00 | ◯ | ◯ | ◯ | ◯ | ◯ | ◯ |
| portion | 5.00 | X | ◯ | ◯ | ◯ | ◯ | ◯ |
| depth | 10.00 | X | ◯ | ◯ | ◯ | ◯ | ◯ |
| (μm) | 20.00 | X | ◯ | ◯ | ◯ | ◯ | ◯ |
| | 25.00 | X | X | ◯ | ◯ | ◯ | ◯ |
| | 30.00 | X | X | X | ◯ | ◯ | ◯ |

As shown in TABLE 1 above, in the case where the recess-shaped portion depth was 0.01 (μm) and the pitch was 0.01 (mm), the Haze value was less than 5.0. In these conditions, the light guide member presented a high outer appearance quality and was determined acceptable (◯).

Similarly, in the case where the recess-shaped portion depth was 0.01 (μm) and the pitch was 0.05, 0.10, 0.20, 0.30 or 0.50 (mm), the light guide member was determined acceptable (◯).

Further, in the case where the recess-shaped portion depth was 1.0 (μm) and the pitch was 0.01, 0.05, 0.10, 0.20. 0.30 or 0.50 (mm), the light guide member was determined acceptable (◯).

Further, in the case where the recess-shaped portion depth was 5.00 (μm) and the pitch was 0.1 (mm), the Haze value was 5.0 or more. In these conditions, the light guide member was cloudy and determined unacceptable (X).

On the other hand, in the case where the recess-shaped portion depth was 5.0 (μm) and the pitch was 0.05, 0.10, 0.20. 0.30 or 0.50 (mm), the light guide member was determined acceptable (◯).

Further, in the case where the recess-shaped portion depth was 10.00 (μm) and the pitch was 0.01 (mm), the light guide member was determined unacceptable (X).

On the other hand, in the case where the recess-shaped portion depth was 10.00 (μm) and the pitch was 0.05, 0.10, 0.20, 0.30 or 0.50 (mm), the light guide member was determined acceptable (◯).

Further, in the case where the recess-shaped portion depth was 20.00 (μm) and the pitch was 0.01 (mm), the light guide member was determined unacceptable (X).

On the other hand, in the case where the recess-shaped portion depth was 20.00 (μm) and the pitch was 0.05, 0.10, 0.20, 0.30 or 0.50 (mm), the light guide member was determined acceptable (◯).

Furthermore, in the case where the recess-shaped portion depth was 25.00 (μm) and the pitch was 0.01 or 0.05 (mm), the light guide member was determined unacceptable (X).

On the other hand, in the case where the recess-shaped portion depth was 25.00 (μm) and the pitch was 0.10, 0.20, 0.30 or 0.50 (mm), the light guide member was determined acceptable (○).

Furthermore, in the case where the recess-shaped portion depth was 30.00 (μm) and the pitch was 0.01, 0.05 or 0.10 (mm), the light guide member was determined unacceptable (X).

On the other hand, in the case where the recess-shaped portion depth was 30.00 (μm) and the pitch was 0.20, 0.30 or 0.50 (mm), the light guide member was determined acceptable (○).

From the aforementioned results of the experiments, it was found that the outer appearance quality of the light guide member when the light source is in the non-illuminated state has a tendency of degrading as the recess-shaped portion depth increases above 25.00 μm. It is considered that such degrading of the outer appearance quality is due to the fact that the recess-shaped portion 43a appears as a line because it is deep. Therefore, it is preferable that the depth of the recess-shaped portion 43a be 0.01 μm or more but 25.00 μm or less.

It was also found that, if the pitch between the recess-shaped portions 43a is 0.01 mm or less, the outer appearance quality of the light guide member when the light source is in the non-illuminated state has a tendency of degrading. It is considered that such degrading of the outer appearance quality is due to the fact that, even where the recess-shaped portions 43a are relatively shallow in depth, the light guide member becomes cloudy because the recess-shaped portions 43a are located too close to each other. Therefore, it is preferable the pitch between the recess-shaped portions 43a be 0.10 mm or more.

Although the experiments were conducted only up to the pitch of 0.5 mm, it is considered, for the foregoing reasons, that the outer appearance quality of the light guide member when the light source is in the non-illuminated state would not degrade even if the pitch between the recess-shaped portions is increased above 0.5 mm. Therefore, it is considered that a high outer appearance quality of the light guide member can be secured if 0.1 mm is set as a lower limit value of the pitch.

The depths of the recess-shaped portions 43a are set within a range of 0.01 to 25.00 μm, and the pitches between the recess-shaped portions 43a are set to be equal to or greater than the lower limit value of 0.10 mm. In this way, it is possible to improve the outer appearance quality of the light guide member when the light source is in the non-illuminated state. Namely, it is possible to provide a vehicle lamp presenting a high outer appearance quality both when the light source is in the illuminated state and when the light source is in the non-illuminated state.

Figure 8:
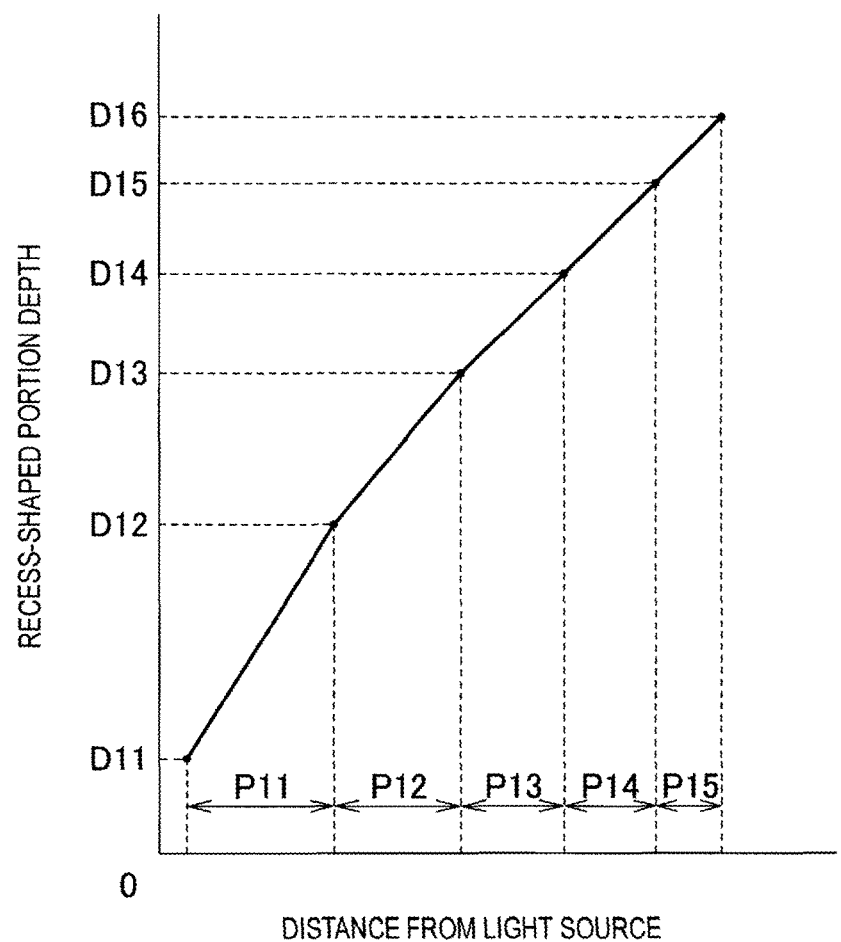
FIG. 8 is a graph explanatory of a modification of the relationship between the formed positions of the individual recess-shaped portions and the depths of the recess-shaped portions shown in FIG. 5.

FIG. 8 shows a modification of the relationship between the distances, from the light source, of the individual recess-shaped portions and the depths of the individual recess-shaped portions. In FIG. 8, the horizontal axis represents the distances from the light source, while the vertical axis represents the depths of the individual recess-shaped portions.

A graph curve in the modification the relationship shown in FIG. 8 is different in inclination from the graph curve shown in FIG. 5. With the curve inclination shown in FIG. 8, it is possible to change the way in which the position lamp (30 in FIG. 3) is illuminated. More specifically, with the inclination shown in FIG. 8, the longitudinal middle portion of the light guide member 33 can be illuminated lightly.

According to the modification too, the pitches P11 to P15 between the recess-shaped portions (33a to 33f in FIG. 3) are set to narrow (decrease) and the depths D11 to D16 of the recess-shaped portions are set to increase as the distances, from the light source (32 in FIG. 3), of the individual recess-shaped portions increase; namely, P11>P12>P13>P14>P15, and D11<D12<D13<D14<D15<D16.

By adjusting the pitches and depths of the recess-shaped portions, the entire position lamp can be illuminated uniformly, but also the degree of brightness (brightness and darkness) of the position lamp can be freely controlled.

Figure 9:
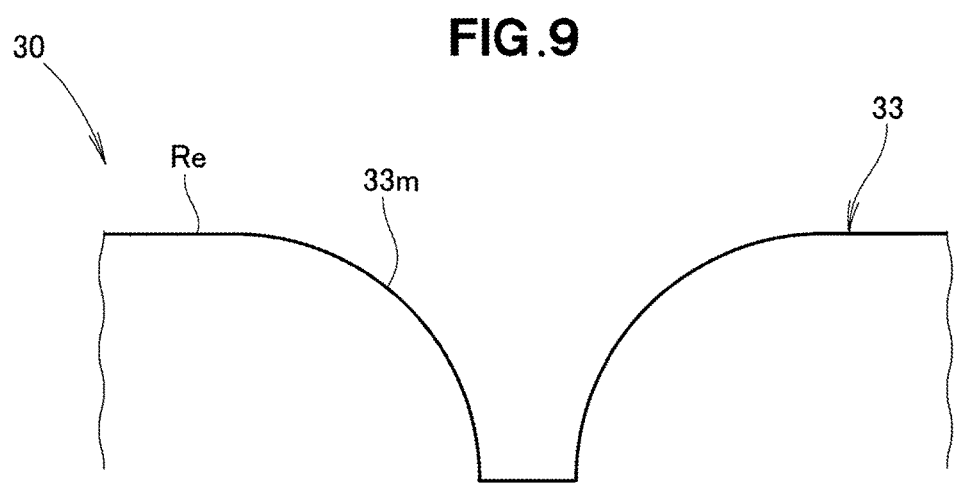
FIG. 9 is a view explanatory of a modification of the recess-shaped portion shown in FIG. 6.

As shown in FIG. 9, the recess-shaped portion 33m comprises arcuate surfaces opposed to and spaced from each other as viewed in section. The bottoms, i.e. deepest parts, of the opposed arcuate surfaces are interconnected by a straight line portion. In the recess-shaped portion 33m, the middle of the straight line portion is a reference point of the pitch. Even with the recess-shaped portion 33m shaped like this, it is possible to achieve predetermined advantageous benefits of the present invention.

Embodiment 2

Figure 10:
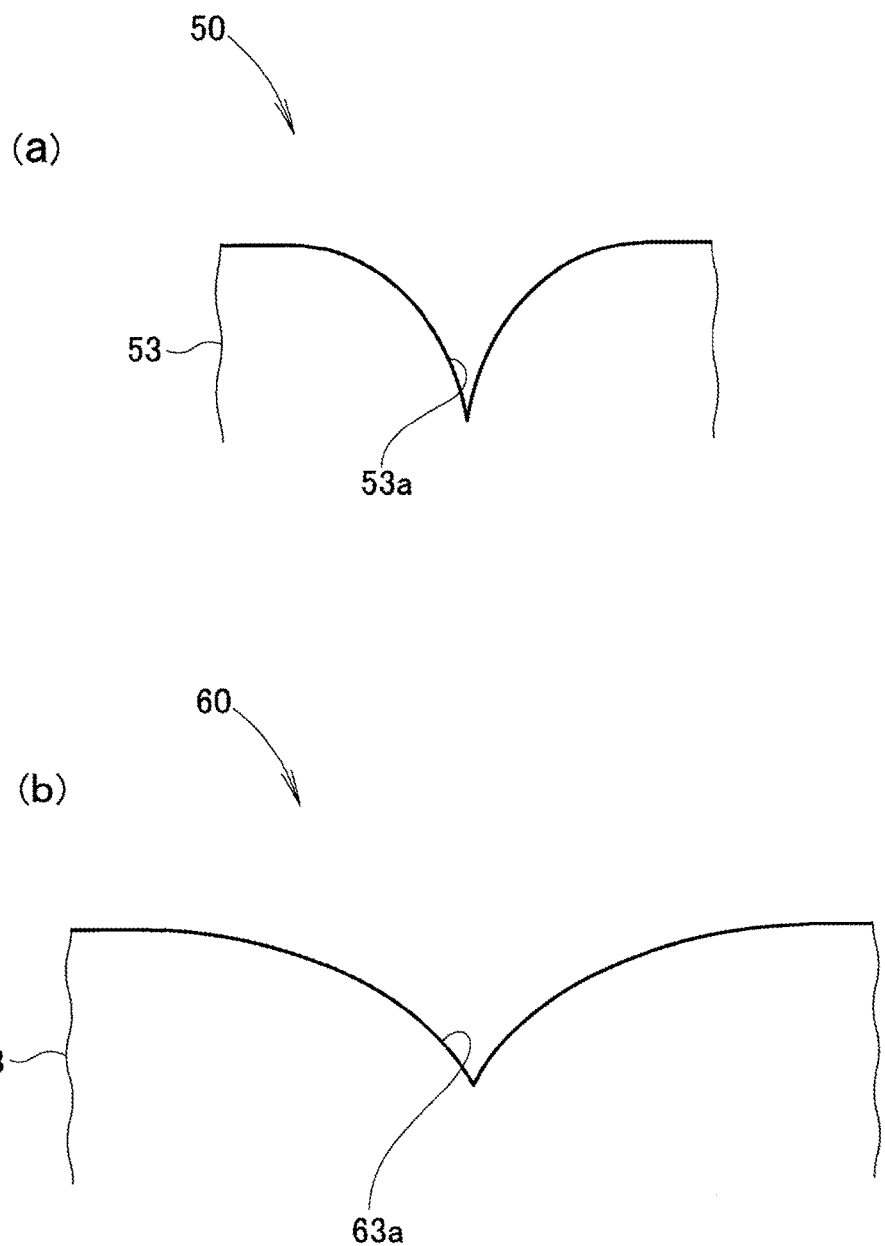
FIG. 10 is an enlarged view showing recess-shaped portions employed in a second embodiment of the vehicle lamp of the present invention.

The following describe, with reference to FIG. 10, a second embodiment of the present invention. FIG. 10(a) shows in enlarged scale primary sections of a light guide member employed in the second embodiment of the vehicle lamp of the present invention. FIG. 10(b) shows a modification of the light guide member employed in the second embodiment of the vehicle lamp of the present invention. FIGS. 10(a) and 10(b) each correspond to FIG. 4(c).

Figure 4:
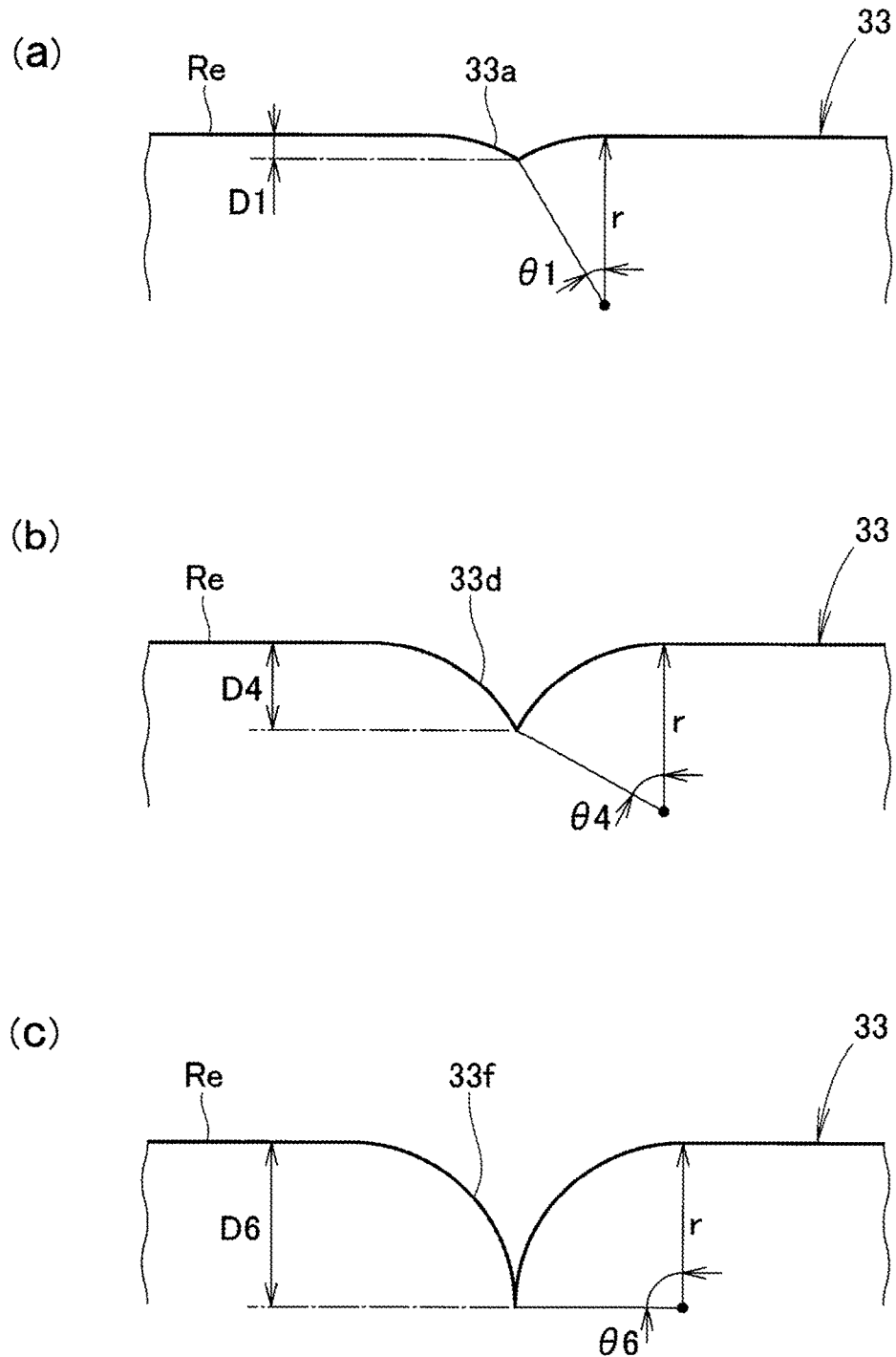
FIG. 4 is an enlarged view of sections depicted at 4(*a*) to 4(*c*) in FIG. 3.

The second embodiment of the vehicle lamp 50, 60 is different from the first embodiment of the vehicle lamp (30 in FIG. 2) in terms of the shapes of the recess-shaped portions (33a to 33f in FIG. 4). The other basic structural features of the second embodiment of the vehicle lamp 50, 60 are similar to those of the first embodiment of the vehicle lamp. The same elements as in the first embodiment are depicted by the same reference characters as used for the first embodiment and will not be described in detail here to avoid unnecessary duplication.

As shown in FIG. 10(a), the recess-shaped portion 53a is formed perpendicularly to the traveling direction of the light emitted by the light source (32 in FIG. 2). Namely, the recess-shaped portion 53a is formed from the back surface toward the front surface of the light guide member 53. Further, as the light guide member 53 is viewed in plan, the recess-shaped portion 53a comprises a pair of opposed surfaces formed in a line-symmetric relation to each other such that the two surfaces extend from one point gradually away from each other. As viewed in plan (i.e., as viewed in a direction perpendicular to the surface where the recess-shaped portion 53a is formed), the respective edges of the two surfaces (i.e., edge of the recess-shaped portion 53a) together form a line corresponding to a part of a halved parabola.

The recess-shaped portion 63a shown in FIG. 10(b) is substantially similar to the recess-shaped portion 53a shown in FIG. 10(a). Namely, the recess-shaped portion 63a is formed perpendicularly to the traveling direction of light emitted by the light source. Namely, the recess-shaped portion 63a is formed from the back surface toward the front surface of the light guide member 63. Further, as the light guide member 63 is viewed in plan, the recess-shaped portion 63a comprises a pair of opposed surfaces formed in a line-symmetric relation to each other such that the two surfaces extend from one point gradually away from each other. As viewed in plan, the respective edges of the two surfaces form a line corresponding to a part of a halved parabola.

With such recess-shaped portions 53a and 63a too, it is possible to achieve the predetermined advantageous benefits of the present invention. The recess-shaped portion 53a of a steeper arcuate shape is more preferable than the recess-shaped portion 63a because it can more effectively diffuse the light from the light source.

Embodiment 3

The following describe, with reference to FIG. 11, a third embodiment of the present invention. FIG. 11(a) shows in enlarged scale primary sections of a light guide member employed in the third embodiment of the vehicle lamp of the present invention. FIG. 11(b) shows a modification of the light guide member employed in the third embodiment of the vehicle lamp of the present invention. FIGS. 11(a) and 11(b) each correspond to FIG. 4(c).

The third embodiment of the vehicle lamp 70, 80 is different from the first embodiment of the vehicle lamp (30 in FIG. 2) in terms of the shapes of the recess-shaped portions (33a to 33f in FIG. 4). The other basic structural features of the third embodiment of the vehicle lamp 70, 80 are similar to those of the first embodiment of the vehicle lamp. The same elements as in the first embodiment are depicted by the same reference characters as used for the first embodiment and will not be described in detail here.

As shown in FIG. 11(a), the recess-shaped portion 73a is formed perpendicularly to the traveling direction of the light emitted by the light source (32 in FIG. 2). Namely, the recess-shaped portion 73a is formed from in the direction the back surface toward the front surface of the light guide member 73. The recess-shaped portion 73a comprises a pair of opposed surfaces formed in a line-symmetric relation to each other such that the two surfaces extend from one point (i.e. deepest point of the recess) gradually away from each other. As viewed in plan (i.e., as viewed in the direction perpendicular to the surface where the recess-shaped portion 73a is formed), the respective edges of the two surfaces (i.e., edge of the recess-shaped portion 73a) form a line corresponding to at least a part of a line of an ellipse divided into one-fourth along its long and short axes.

The recess-shaped portion 83a shown in FIG. 11(b) is similar to the recess-shaped portion 73a shown in FIG. 11(a). Namely, the recess-shaped portion 83a is formed perpendicularly to the traveling direction of light emitted by the light source. Namely, the recess-shaped portion 83a is formed from the back surface toward the front surface of the light guide member 83. Namely, the recess-shaped portion 83a is formed from the back surface toward the front surface of the light guide member 83. The recess-shaped portion 83a comprises a pair of opposed surfaces formed in a line-symmetric relation to each other such that the two surfaces extend from one point (i.e. deepest point of the recess) gradually away from each other. As viewed in plan, the respective edges of the two surfaces form a line corresponding to a part of a line of an ellipse divided into one-fourth along its long and short axes.

With such recess-shaped portions 73a and 83a too, it is possible to achieve the predetermined advantageous benefits of the present invention. The recess-shaped portion 73a of a steeper arc shape is more preferable than the recess-shaped portion 83a because it can more effectively diffuse the light from the light source.

Whereas the vehicle lamp of the present invention has been described above as a position lamp of a passenger vehicle, the basic principles of the present invention are also applicable to any other outdoor lamps or indoor lamps. Further, the vehicle lamp of the present invention may be mounted on motorcycles. Namely, the vehicle lamp of the present invention is not limited to the aforementioned constructions and applications as long as it is a lamp designed for use in vehicles.

INDUSTRIAL APPLICABILITY

The vehicle lamp of the present invention is well suited for application as a position lamp for a passenger vehicle.

LIST OF REFERENCE SIGNS

11 . . . vehicle body, 30 . . . position lamp (vehicle lamp), 50, 60, 70, 80 . . . vehicle lamp, 32 . . . light source, 33, 53, 63, 73, 83 . . . light guide member, 33a to 33m, 53a, 63a, 73a. 83a . . . recess-shaped portion

The invention claimed is:

1. A vehicle lamp including a light source mounted on a vehicle body, and a light guide member for guiding light emitted by the light source,
   wherein the light guide member has a row of a plurality of traversal notch-shaped grooves formed therein substantially perpendicularly to a traveling direction of the light emitted by the light source,
   wherein the traversal notch-shaped grooves extend from one side edge to the other side edge of the light guide member,
   the traversal notch-shaped grooves are formed such that, as distances from the light source of individual ones of the traversal notch-shaped grooves increase, pitches between the traversal notch-shaped grooves decrease and depths of the traversal notch-shaped grooves increase, and
   each of the traversal notch-shaped grooves is shaped such that two convex arcuate back surfaces having a constant radius of curvature are opposed to each other,
   wherein arcuate surface portions of each of the traversal notch-shaped grooves are formed spaced from each other with respective deepest parts of the arcuate surface portions interconnected by a straight line portion, as viewed in a section, and
   wherein, as viewed in the section, a length of each arcuate surface portion of each of the traversal notch-shaped grooves along the traveling direction of the light is greater than that of the straight line portion of the corresponding traversal notch-shaped groove.

2. The vehicle lamp according to claim 1, wherein the plurality of traversal notch-shaped grooves each have an arcuate section of a same radius of curvature, and the depth of each of the traversal notch-shaped grooves is defined by a central angle of the arcuate section.

3. The vehicle lamp according to claim 1, wherein, as viewed in a section taken along an arranged direction of the plurality of traversal notch-shaped grooves, portions between the traversal notch-shaped grooves are each formed straight or substantially straight such that the light does not leak to outside of the light guide member.

4. The vehicle lamp according to claim 1, wherein the depths of the traversal notch-shaped grooves are set within a range of 0.01 µm to 25.00 µm, and the pitches between the traversal notch-shaped grooves are set equal to or greater than a lower limit value of 0.1 mm.

5. The vehicle lamp according to claim 2, wherein, as viewed in a section taken along an arranged direction of the plurality of traversal notch-shaped grooves, portions between the traversal notch-shaped grooves are each formed straight or substantially straight such that the light does not leak to outside of the light guide member.

6. The vehicle lamp according to claim 2, wherein the depths of the traversal notch-shaped grooves are set within a range of 0.01 µm to 25.00 µm, and the pitches between the traversal notch-shaped grooves are set equal to or greater than a lower limit value of 0.1 mm.

7. The vehicle lamp according to claim 3, wherein the depths of the traversal notch-shaped grooves are set within a range of 0.01 µm to 25.00 µm, and the pitches between the traversal notch-shaped grooves are set equal to or greater than a lower limit value of 0.1 mm.

8. The vehicle lamp according to claim 1 wherein the light guide member is formed of acryl material.

9. The vehicle lamp of claim 1, wherein the vehicle lamp constitutes a part of a vehicle headlight unit mounted to a front section of the vehicle body, wherein the headlight unit includes a high beam light source, a low beam light source, and wherein the vehicle lamp is configured to surround both the high beam light source and the low beam light source.

10. The vehicle lamp according to claim 1, wherein the depth of each of the traversal notch-shaped grooves is defined by a central angle of the arcuate section, and wherein, as viewed in the section, the length of each arcuate surface portion of each of the traversal notch-shaped grooves along the traveling direction of the light is equal to or smaller than the depth of the corresponding traversal notch-shaped groove.

11. The vehicle lamp according to claim 10, wherein the depths of the traversal notch-shaped grooves are set within a range of 0.01 µm to 25.00 µm, and the pitches between the traversal notch-shaped grooves are set equal to or greater than a lower limit value of 0.1 mm.

* * * * *